(12) United States Patent
Iwata et al.

(10) Patent No.: US 7,876,150 B2
(45) Date of Patent: Jan. 25, 2011

(54) ASK DEMODULATOR, COMMUNICATION MODULE, COMMUNICATION DEVICE, AND ASK DEMODULATION METHOD

(75) Inventors: Shigeyasu Iwata, Tokyo (JP); Manabu Ishibe, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 52 days.

(21) Appl. No.: 12/476,889

(22) Filed: Jun. 2, 2009

(65) Prior Publication Data

US 2010/0158157 A1 Jun. 24, 2010

(30) Foreign Application Priority Data

Dec. 24, 2008 (JP) ............................. 2008-328422

(51) Int. Cl.
*H03K 9/00* (2006.01)
*H03K 9/02* (2006.01)

(52) U.S. Cl. ....................................... 329/311; 375/353

(58) Field of Classification Search ................ 329/311, 329/347, 349, 353; 375/320, 340, 353
See application file for complete search history.

(56) References Cited

U.S. PATENT DOCUMENTS 7,054,389 B2 * 5/2006 Yokogawa et al. .......... 375/340

FOREIGN PATENT DOCUMENTS

| JP | 11-088449 | 3/1999 |
|---|---|---|
| JP | 2000-174830 | 6/2000 |
| JP | 2001-148621 | 5/2001 |
| JP | 2001-292183 | 10/2001 |
| JP | 2004-056458 | 2/2004 |
| JP | 2004-194124 | 7/2004 |
| JP | 2004-304515 | 10/2004 |
| JP | 2006-295319 | 10/2006 |

* cited by examiner

*Primary Examiner*—David Mis
(74) *Attorney, Agent, or Firm*—Blakely, Sokoloff, Taylor & Zafman LLP

(57) ABSTRACT

According to one embodiment, an ASK demodulator includes a rectifier, a first low-pass filter, a second low-pass filter, a comparator, and a threshold controller. The rectifier rectifies an ASK signal. The first low-pass filter outputs a signal corresponding to an envelope curve output from the rectifier. The second low-pass filter outputs an integrated signal of the signal output from the first low-pass filter. The comparator detects an output logic in accordance with comparison between the signal output from the first low-pass filter and a threshold obtained by adding a predetermined hysteresis width to the integrated signal output from the second low-pass filter. The threshold controller controls the threshold by setting the predetermined hysteresis width based on a direct current offset voltage caused by element dispersions of the comparator.

8 Claims, 9 Drawing Sheets

| S | R | Vout |
|---|---|------|
| 0 | 0 | MAINTAIN |
| 0 | 1 | 0 |
| 1 | 0 | 1 |
| 1 | 1 | INHIBIT INPUT |

ASK DEMODULATOR, COMMUNICATION MODULE, COMMUNICATION DEVICE, AND ASK DEMODULATION METHOD

CROSS-REFERENCE TO RELATED APPLICATIONS

This application is based upon and claims the benefit of priority from Japanese Patent Application No. 2008-328422, filed Dec. 24, 2008, the entire contents of which are incorporated herein by reference.

BACKGROUND

1. Field

One embodiment of the invention relates to an amplitude shift keying (ASK) demodulator that demodulates an ASK signal wave modulated by ASK, a communication module, a communication device, and an ASK demodulation method.

2. Description of the Related Art

A general amplitude shift keying (ASK) demodulator that demodulates an input signal modulated by ASK (an ASK signal) is provided with a rectifier and a comparator. The rectifier detects and rectifies a signal received through an antenna, thereby obtaining a demodulated signal. The comparator compares the demodulated signal with a threshold and amplifies it to a logic level, thereby converting it to a binary signal. It is often the case that the comparator has the hysteresis function to suppress malfunction due to noise (see Japanese Patent Application Publication (KOKAI) No. 2006-295319).

Japanese Patent Application Publication (KOKAI) No. 2006-295319 discloses a conventional ASK demodulator. With the conventional ASK demodulator, even if a period of no signal or a period for a logic "0" or "1" in an input ASK signal continues for a long time, an output signal neither becomes unstable nor varies because of the comparator with the hysteresis function. Besides, the conventional ASK demodulator is not provided with a differentiating circuit inside it, and therefore has no problem in demodulating a band-limited ASK signal.

With the conventional ASK demodulator, however, the reception sensitivity is limited due to a DC offset voltage caused by element dispersions and hysteresis width of the comparator with the hysteresis function.

If the hysteresis width is set to narrow, the drop in the reception sensitivity can be reduced. To set the hysteresis width to narrow, it is necessary to increase the resistance ratio of the comparator. On the other hand, to improve the reception sensitivity by reducing the DC offset voltage caused by element dispersions, it is necessary to increase the size of the element. Such an increase in the resistance ratio and the size of the element results in higher costs, especially when considering integration into large scale integration (LSI).

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

Figure 1:
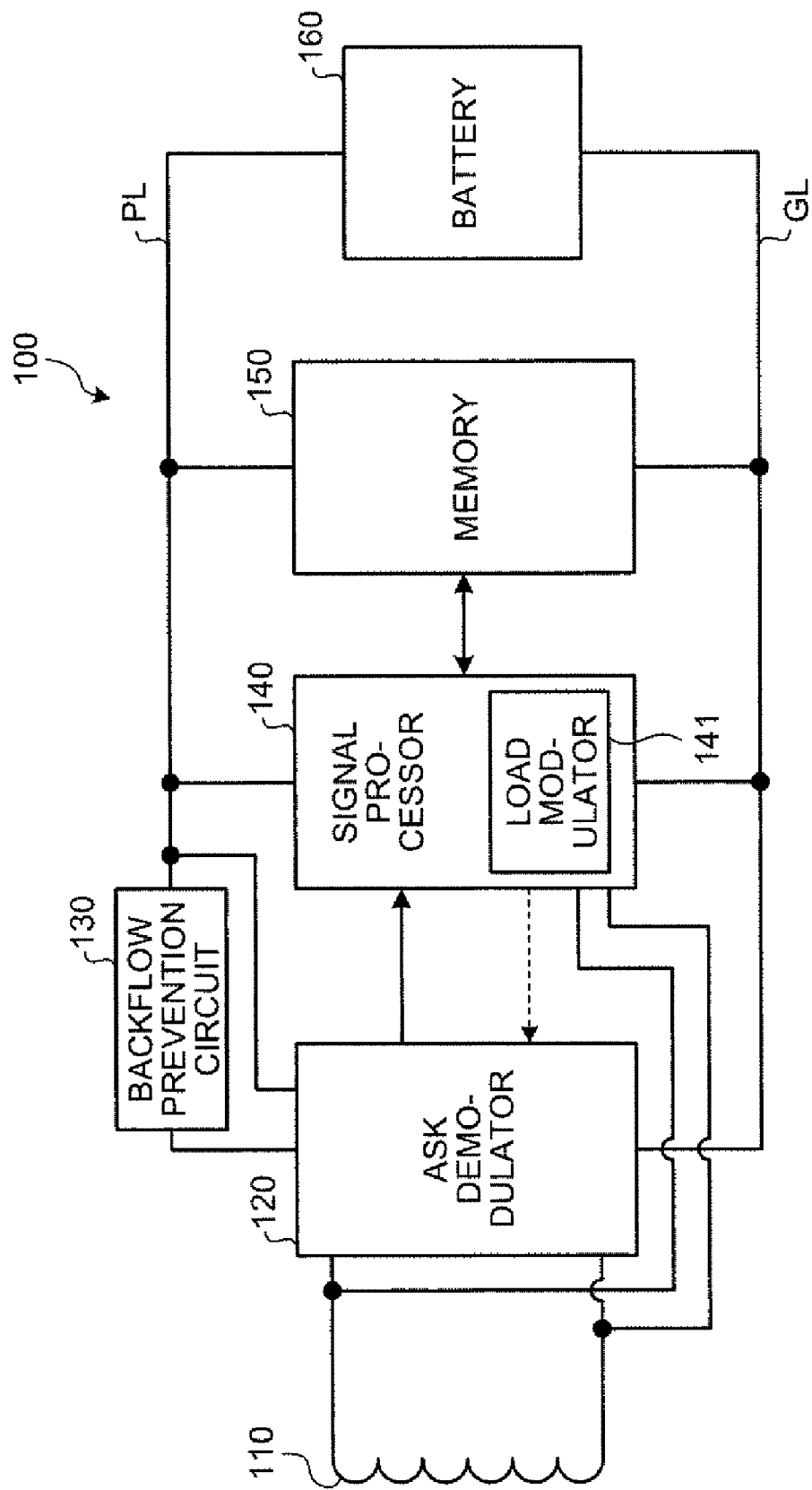
FIG. 1 is an exemplary block diagram of a radio frequency identification (RFID) tag according to a first embodiment of the invention.

Various embodiments according to the invention will be described hereinafter with reference to the accompanying drawings. In general, according to one embodiment of the invention, an amplitude shift keying (ASK) demodulator comprises a rectifier, a first low-pass filter, a second low-pass filter, a comparator, and a threshold controller. The rectifier is configured to rectify an ASK signal. The first low-pass filter is configured to output a signal corresponding to an envelope curve output from the rectifier. The second low-pass filter is configured to output an integrated signal of the signal output from the first low-pass filter. The comparator is configured to detect an output logic in accordance with comparison between the signal output from the first low-pass filter and a threshold obtained by adding a predetermined hysteresis width to the integrated signal output from the second low-pass filter. The threshold controller is configured to control the threshold by setting the predetermined hysteresis width based on a direct current offset voltage caused by element dispersions of the comparator.

According to another embodiment of the invention, a communication module comprises an antenna and an ASK demodulator. The antenna is configured to receive an ASK signal. The ASK demodulator is configured to demodulate the ASK signal received by the antenna, and comprises a rectifier, a first low-pass filter, a second low-pass filter, a comparator, and a threshold controller. The rectifier is configured to rectify an ASK signal. The first low-pass filter is configured to output a signal corresponding to an envelope curve output from the rectifier. The second low-pass filter is configured to output an integrated signal of the signal output from the first low-pass filter. The comparator is configured to detect an output logic in accordance with comparison between the signal output from the first low-pass filter and a threshold obtained by adding a predetermined hysteresis width to the integrated signal output from the second low-pass filter. The threshold controller is configured to control the threshold by setting the predetermined hysteresis width based on a direct current offset voltage caused by element dispersions of the comparator.

According to still another embodiment of the invention, there is provided an ASK modulation method comprising: a rectifier rectifying an ASK signal; a first low-pass filter outputting a signal corresponding to an envelope curve output from the rectifier; a second low-pass filter outputting an integrated signal of the signal output from the first low-pass filter; a comparator detecting an output logic in accordance with comparison between the signal output from the first low-pass filter and a threshold obtained by adding a predetermined hysteresis width to the integrated signal output from the second low-pass filter; and a threshold controller controlling the threshold by setting the predetermined hysteresis width based on a direct current offset voltage.

A first embodiment of the invention will be described with reference to FIGS. 1 to 11. In the first embodiments a communication device provided with an amplitude shift keying (ASK) demodulator is described by way of example as a radio frequency identification (RFID) tag.

FIG. 1 is a block diagram of an RFID tag 100 according to the first embodiment. As illustrated in FIG. 1, the RFID tag 100 comprises a loop antenna 110, an ASK demodulator 120, a backflow prevention circuit 130, a signal processor 140, a memory 150, and a battery 160. The loop antenna 110 and the ASK demodulator 120 constitute a communication module. The battery 160 is a secondary battery. The RFID tag 100 is driven by a power source voltage from the battery 160, and thus it is not essential to generate a power source voltage from the ASK demodulator 120. That is, the ASK demodulator 120, the backflow prevention circuit 130, the signal processor 140, and the memory 150 are each connected to a power source line PL and a ground line GL extending from the battery 160.

The loop antenna 110 induces an alternating current along the antenna line according to the change of magnetic flux provided from a RFID reader/writer (not illustrated). The alternating current is input to a signal input terminal of the ASK demodulator 120. The loop antenna 110 receives a data signal (an ASK signal modulated by ASK).

The ASK demodulator 120 demodulates the ASK signal received by the loop antenna 110. As will be described in detail later, the ASK demodulator 120 comprises a rectifier and a comparator. The rectifier detects and rectifies the ASK signal received through the loop antenna 110, thereby obtaining a demodulated signal. The comparator compares the demodulated signal with a threshold and amplifies it to a logic level, thereby converting it to a binary signal.

The signal processor 140 retrieves data (for example, tag identification information) from the memory 150 or writes data to the memory 150 based on the data signal received from the ASK demodulator 120. The signal processor 140 comprises a load modulator 141 that is connected to the loop antenna 110. The load modulator 141 modulates current of the loop antenna 110, and thereby data retrieved from the memory 150 is transmitted to the RFID reader/writer. More specifically, the load modulator 141 generate a demagnetizing field in the loop antenna 110. The demagnetizing field slightly changes the current flowing through the antenna of the RFID reader/writer. The RFID reader/writer detects the slight change, and recognizes it as a data signal.

Figure 2:
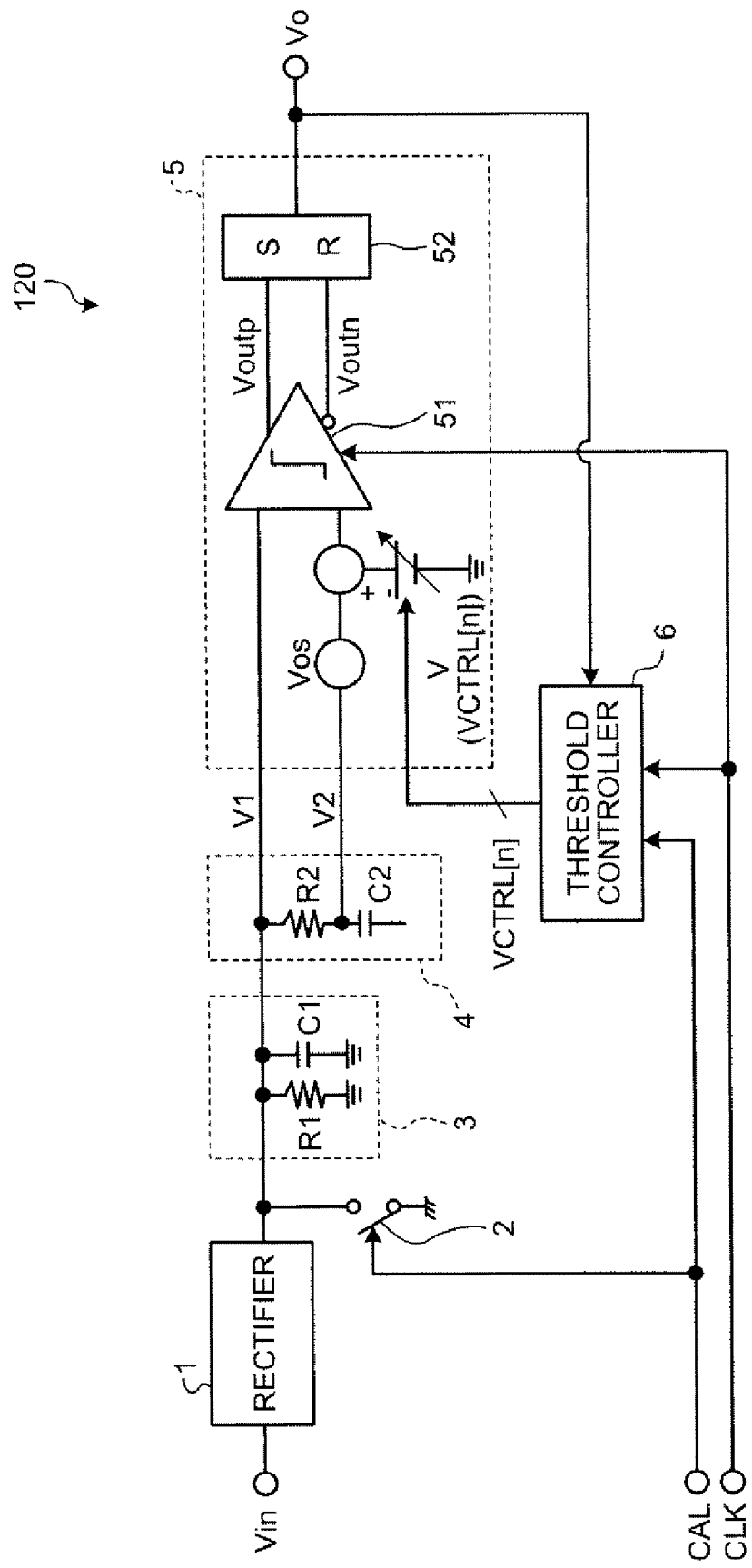
FIG. 2 is an exemplary circuit diagram of an amplitude shift keying (ASK) demodulator in the first embodiment.

FIG. 2 is a circuit diagram of the ASK demodulator 120. As illustrated in FIG. 2, the ASK demodulator 120 comprises a rectifier 1, a switch 2, a first low-pass filter 3, a second low-pass filter 4, a variable threshold comparator 5, and a threshold controller 6. A clock signal CLK operates at an oversampling rate for the data rate of an input ASK signal to identify a logic "0" or "1".

The rectifier 1 detects and rectifies an ASK signal Vin received through the loop antenna 110, thereby obtaining a demodulated signal. In the following, the rectifier 1 will be described in detail.

Figure 3:
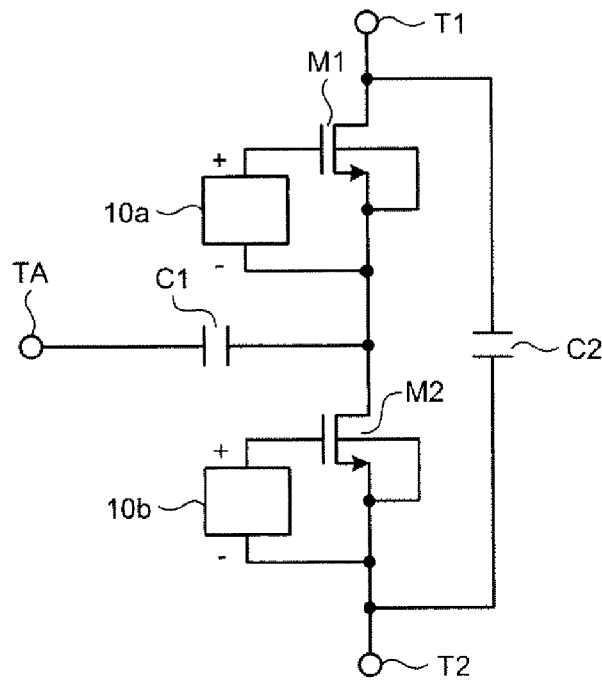
FIG. 3 is an exemplary circuit diagram of part of a rectifier in the first embodiment.

FIG. 3 is a circuit diagram of part of the rectifier 1. As illustrated in FIG. 3, in the part of the rectifier 1 (hereinafter, "diode circuit"), a negative-channel metal-oxide semiconductor (NMOS) transistor M1 is connected to a back gate terminal and a source terminal, and a drain terminal is connected to a plus terminal T1. Further, between the gate terminal and the source terminal is connected a bias circuit 10a capable of generating a predetermined voltage. With this connection, the NMOS transistor M1 functions as a diode device using a PN junction on the drain side. The bias circuit 10a applies the predetermined voltage between the gate terminal and the source terminal of the NMOS transistor M1. The bias circuit 10a generates, as the predetermined voltage, a voltage (hereinafter, "diode bias voltage") lower than a threshold voltage necessary for the NMOS transistor M1 to exhibit the rectifying characteristics. The diode bias voltage is in the range of, for example, 0 V to 1.0 V, preferably, a value nearly the threshold voltage (for example, 0.6 V). In other words, the NMOS transistor M1 is biased with the diode bias voltage between the gate terminal and the source terminal thereof so that it can rectifies even an alternating current with an effective value equal to or lower than the threshold voltage. The diode circuit is capable of rectifying an alternating current with an effective value of about 100 mV if the diode bias voltage is, for example, 0.6 V.

Similarly, an NMOS transistor M2 is connected to a back gate terminal and a source terminal, and the source terminal is connected to a minus terminal T2. Further, between the gate terminal and the source terminal is connected a bias circuit 10b. The NMOS transistor M2 functions in the same manner as the NMOS transistor M1. The NMOS transistor M2 is also biased by the bias circuit 10b with the diode bias voltage between the gate terminal and the source terminal thereof.

The source terminal of the NMOS transistor M1 is connected to the drain terminal of the NMOS transistor M2, and an end of a capacitor C1 is connected to a connection line between them. The other end of the capacitor C1 is connected to a signal input terminal TA. The capacitor C1 functions as a coupling capacitance. When the rectifier 1 is used in the REID tag 100, the capacitor C1 is connected to the loop antenna 110, and also functions as a series resonance capacitor.

A capacitor C2 is connected between the drain terminal of the NMOS transistor M1 and the source terminal of the NMOS transistor M2. A signal half-wave rectified by the NMOS transistor M1 and the NMOS transistor M2 is smoothed by the capacitor C2. With this smoothing, a direct current can be obtained from between both ends of the capacitor C2, i.e., between the plus terminal T1 and the minus terminal T2.

Both the NMOS transistor M1 and the NMOS transistor M2 have a triple well structure, and are isolated from the substrate. Therefore, each of the source terminals is connected to a P-well below the NMOS transistors, each of the drain terminals is connected to an N-well, and the diode device is formed inside the MOS transistor by a PN junction.

Figure 4:
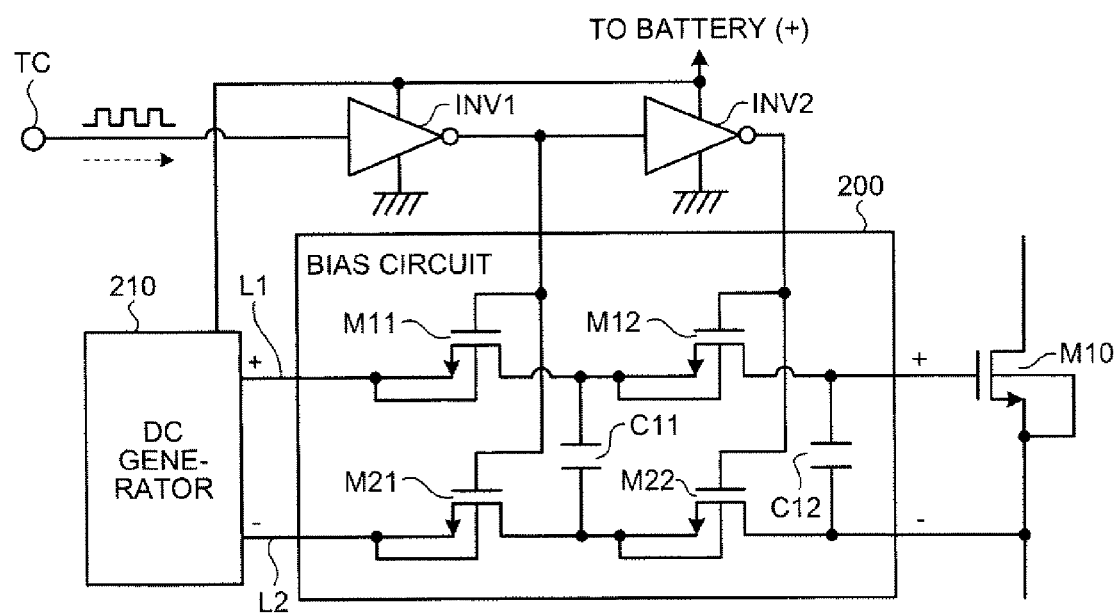
FIG. 4 is an exemplary circuit diagram of a bias circuit illustrated in FIG. 3 in the first embodiment.

FIG. 4 is a circuit diagram of the bias circuits 10a and 10b illustrated in FIG. 3. In FIG. 4, a bias circuit 200 corresponds to the bias circuit 10a or 10b. The bias circuit 200 comprises two NMOS transistors M11 and M12 connected in series. The NMOS transistors M11 and M12 each function as a transfer gate and are located on a plus line L1. The bias circuit 200 further comprises two NMOS transistors M21 and M22 connected in series. The NMOS transistors M21 and M22 also each function as a transfer gate and are located on a minus line L2. The gate terminal of the NMOS transistor M11 and that of the NMOS transistor M21 are connected to each other. Similarly, the gate terminal of the NMOS transistor M12 and that of the NMOS transistor M22 are connected to each other. A capacitor C11 is connected to between a line that connects between the drain terminal of the NMOS transistor M11 and the source terminal of the NMOS transistor M12 and a line that connects between the drain terminal of the NMOS transistor M21 and the source terminal of the NMOS transistor M22. Further, a capacitor C12 is connected to between the drain terminal of the NMOS transistor M12 and that of the NMOS transistor M22.

To the bias circuit 200 are connected, as peripheral circuits, a direct current (DC) generator 210, an inverter INV1, and an inverter INV2. The DC generator 210 generates a direct current corresponding to the diode bias voltage described above from the main power source of a device provided with the rectifier 1 of the first embodiment. A specific example of the DC generator 210 will be described later. The direct current voltage generated by the DC generator 210 is applied to between the plus line L1 and the minus line L2 of the bias circuit 200. The NMOS transistor M10 represents the NMOS transistors M1 and M2 illustrated in FIG. 3. The NMOS transistor M10 operates at a high frequency on the order of GHz, and therefore, it is necessary to reduce the parasitic capacitance as far as possible. The DC generator 210 has a large capacity to stably generates a direct current. For this reason, the diode bias voltage obtained by the DC generator 210 is not directly applied in parallel to between the gate and source of the NMOS transistor M10, but there is provided the bias circuit 200 as illustrated in FIG. 4.

The input terminal of the inverter INV1 is connected to a clock input terminal TC, and thus receives a clock signal of a predetermined frequency. The clock signal is generated by, for example, a clock generator, which will be described later. The output terminal of the inverter INV1 is connected to the gates of the NMOS transistors M11 and M21. The output terminal of the inverter INV1 is also connected to the input terminal of the inverter INV2. Similarly, the output terminal of the inverter INV2 is connected to the gates of the NMOS transistors M12 and M22.

If a clock signal received through the clock input terminal TC has a logic level "L", the inverter INV1 outputs a logic level "H", while the inverter INV2 outputs a logic level "L". Accordingly, the NMOS transistors M11 and M21 turn ON, and the capacitor C11 is charged with a DC voltage supplied from the DC generator 210. Meanwhile, the NMOS transistors M12 and M22 turn OFF, and no DC voltage is applied to the capacitor C12.

On the other hand, if a clock signal received through the clock input terminal TC has a logic level "H", the inverter INV1 outputs a logic level "L", while the inverter INV2 outputs a logic level "H". Accordingly, the NMOS transistors M11 and M21 turn OFF, and the NMOS transistors M12 and M22 turn ON. With this, the charge in the capacitor C11 is supplied to the capacitor C12. Since both ends of the capacitor C12 are each connected to the output terminal of the bias circuit 200, the voltage at both the ends of the capacitor C12 is applied as the diode bias voltage to between the gate terminal and source terminal of the diode-connected NMOS transistor M10.

It is suffice that the voltage at both the ends of the capacitor C12 results in matching the diode bias voltage of the NMOS transistor M10. The DC voltage supplied from the DC generator 210 need not necessarily be equal to the diode bias voltage. For example, by switching the NMOS transistors M11, M12, M21, and M22 using pulse width modulation (PWM) control, the voltage of the capacitor C12 can be fixed to an arbitrary value. In this case, the main power source may be connected to between the plus line L1 and the minus line L2 without the DC generator 210.

Figure 5:
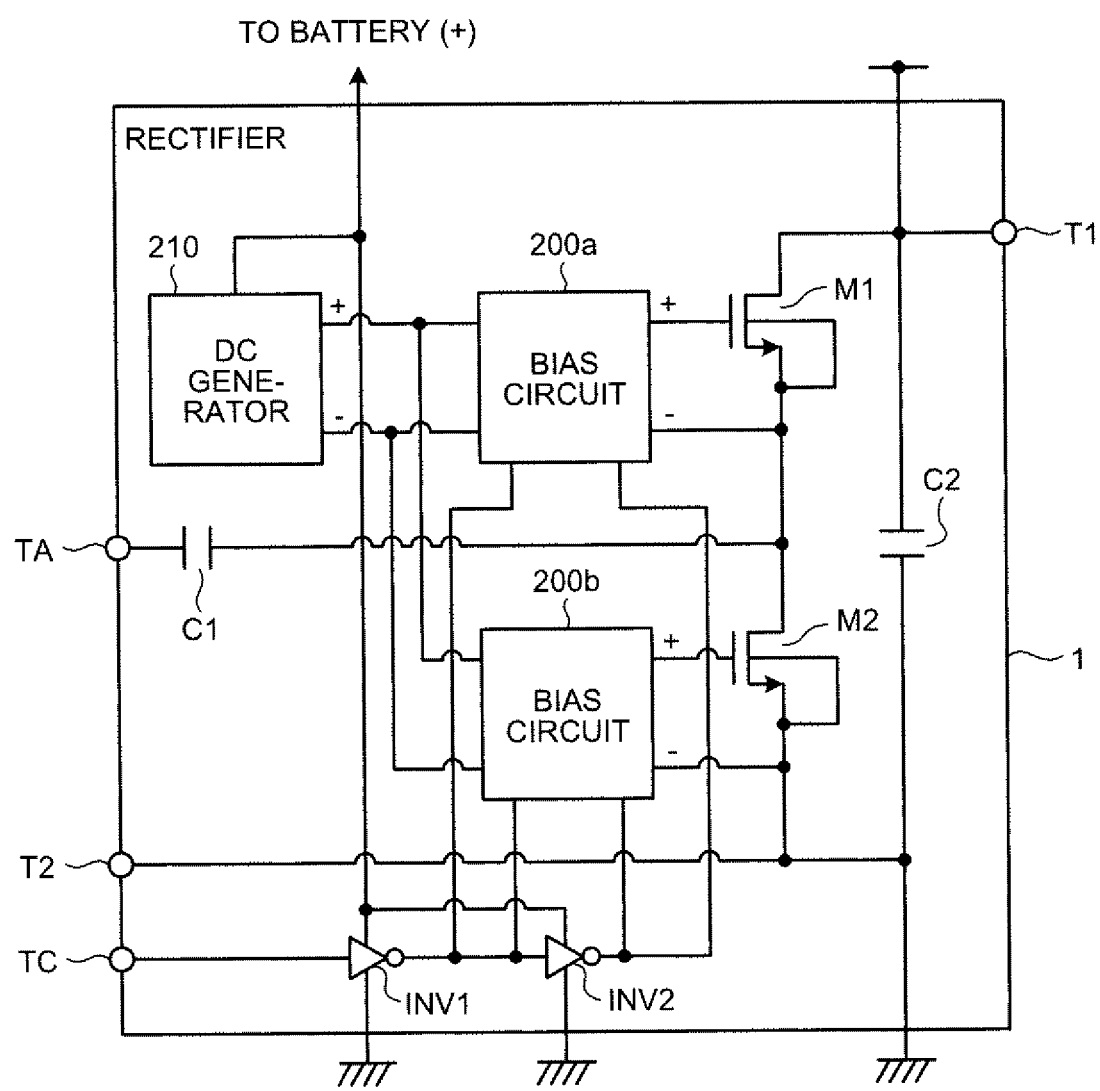
FIG. 5 is an exemplary circuit diagram of the rectifier in the first embodiment.

FIG. 5 is a circuit diagram of the rectifier 1. The rectifier 1 illustrated in FIG. 5 corresponds to a circuit obtained by applying the bias circuit 200 and the peripheral circuits thereof (the DC generator 210, and the inverters INV1 and INV2) to the diode circuit illustrated in FIG. 3. In FIG. 5, bias circuits 200a and 200b each corresponds to the bias circuit 200 illustrated in FIG. 4. As illustrated in FIG. 5, each of the diode-connected NMOS transistors M1 and M2 needs the bias circuit 200 illustrated in FIG. 4. Meanwhile, the DC generator 210, and the inverters INV1 and INV2, i.e., the peripheral circuits of the bias circuit 200, are shared by the bias circuits 200a and 200b.

While the diode-connected NMOS transistor is described as the diode circuit in the above example, a positive-channel metal oxide semiconductor (PMOS) transistor may also be used. In addition, the NMOS transistor is used as the transfer gate that constitutes the bias circuit 200, a PMOS transistor may also be used. Further, in FIG. 4, the inverter INV2 may be eliminated, and only the NMOS transistors M12 and M22 may be replaced with PMOS transistors.

The rectifier 1 as described above is driven by a power source voltage supplied from the battery 160. Therefore, the DC generator 210 in the rectifier 1 is also driven by a power source voltage supplied from the battery 160, and generates a desired direct current from the power source voltage supplied from the battery 160. That is, in the rectifier 1, regardless of whether an alternating current is received from the loop antenna 110, the diode bias voltage is always applied to between the gate and source of the MOS transistor that constitutes the diode circuit. Alternatively, the diode bias voltage is applied by an external trigger. Thus, the rectifier 1 can rectify even a weak alternating current with an effective value lower than 0.7 V induced in the loop antenna 110. In other words, the rectifier 1 can rectify a weak data signal (an ASK signal) received by the loop antenna 110. The direct current obtained by the rectifier 1 is supplied via the backflow prevention circuit 130 to the battery 160 to charge it.

While the switch 2 is illustrated as being located between the output of the rectifier 1 and the ground (GND), it may be located between the input of the rectifier 1 and the GND to compensate a DC offset voltage Vos caused by element dispersions of the variable threshold comparator 5 with noise being received from the rectifier 1. Besides, the switch 2 may be maintained OFF or eliminated to compensate the DC offset voltage Vos caused by element dispersions of the variable threshold comparator 5 with noise being received from the outside.

The first low-pass filter 3 comprises a resistance R1 and a capacitance C1, which are connected in parallel between the output of the rectifier 1 and the GND. The time constant of the first low-pass filter 3 is adjusted such that the output of the rectifier 1 corresponds to the envelope curve of an input voltage (an ASK signal) Vin.

The second low-pass filter 4 comprises a resistance R2 and a capacitance C2, which are connected in series between the output of the first low-pass filter 3 and the GND such that the capacitance C2 is located on the GND side. The second low-pass filter 4 outputs an integrated signal V2 of an output signal V1 from the first low-pass filter 3. The resistance R2 is set to a large value not to be a load on the first low-pass filter 3.

While the first low-pass filter 3 and the second low-pass filter 4 are described above as being provided with a resistance and a capacitance, this is by way of example only and not by way of limitation.

The variable threshold comparator 5 compares the output V1 of the first low-pass filter 3 with a threshold VTH obtained by adding a predetermined hysteresis width to the output V2 of the second low-pass filter 4, and amplifies the output V1 to a logic level. The variable threshold comparator 5 comprises a dynamic latch 51 and a set reset (RS) latch 52. The dynamic latch 51 consumes power only while the clock is in operation. Accordingly, less power is consumed during the waiting time for a radio signal.

Figure 6:
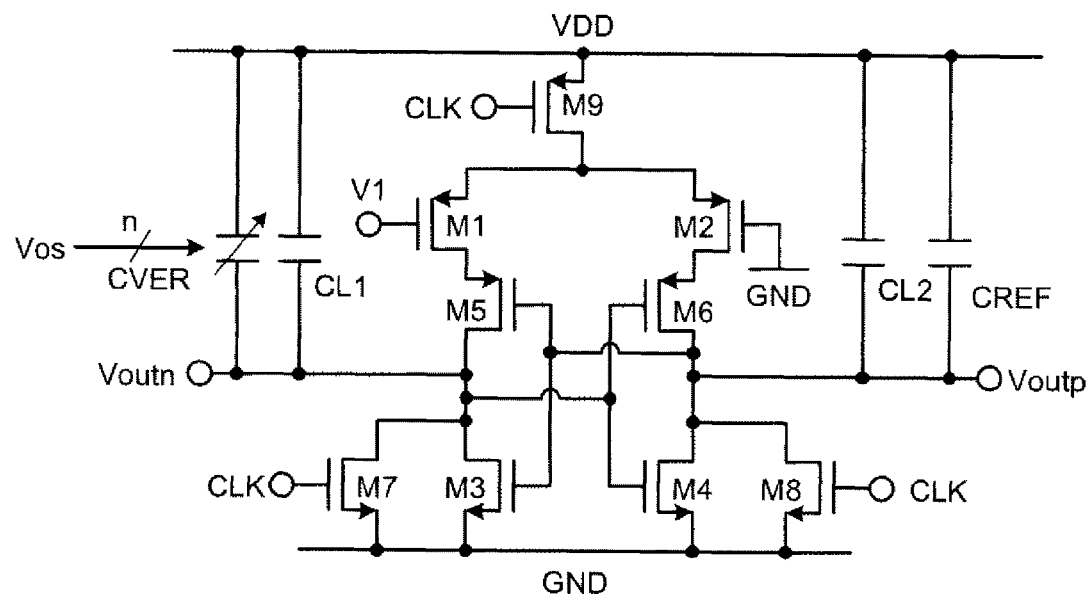
FIG. 6 is an exemplary circuit diagram of a dynamic latch in the first embodiment.

FIG. 6 illustrates an example of the circuitry of the dynamic latch 51. The dynamic latch 51 can operate with an input voltage of the ground level. While the clock signal CLK indicates "1", the dynamic latch 51 precharges outputs Voutp and Voutn to the GND to thereby reduce the power consumption.

The dynamic latch 51 comprises a differential pair of the MOS transistors M1 and M2, a latch circuit formed of MOS transistors M3 to M6, and MOS switches M7 to M9. When the value of the clock signal CLK is "1", the MOS switches M7 and M8 are ON, while the MOS switch M9 is OFF. As a result, no current flows, and the outputs Voutp and Voutn are precharged to the GND.

When the value of the clock signal CLK becomes "0", the MOS switches M7 and M8 turn OFF, and the outputs Voutp and Voutn are separated from the GND. At the same time, the MOS switch M9 turns ON, and thereby current starts flowing.

If the input voltage V1 is higher than the GND voltage, the current flowing through a left path including the MOS transistors M1, M3, and M5 is higher than the current flowing through a right path including the MOS transistors M2, M4, and M6. This causes the potential difference between the Voutp and Voutn. The positive feedback amplifier circuit formed of the MOS transistors M3 to M6 amplifies the output potential difference, and then sets the Voutp to VDD (a power supply voltage) and Voutn to the GND voltage. This state is referred to as "latch mode".

Figure 7:
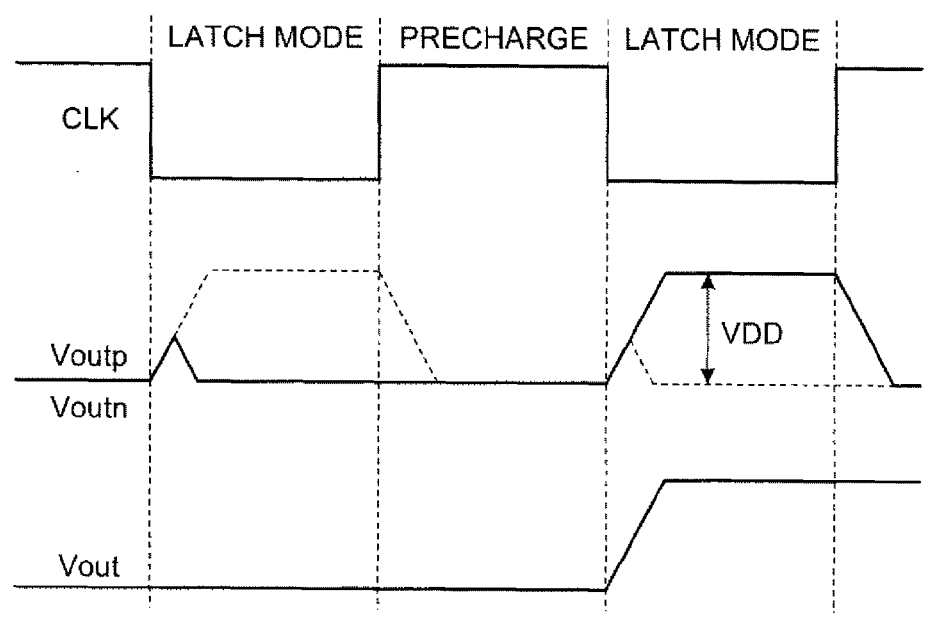
FIG. 7 is an exemplary timing chart of the operation of a variable threshold comparator in the first embodiment.

As illustrated in FIG. 7, the dynamic latch 51 performs a comparison while switching the precharge and latch modes every half cycle. The SR latch 52 may be, for example, a NAND SR latch, and operates as indicated by a truth table illustrated in FIG. 8. That is, when S (=Voutp)=0 and R (=Voutn)=1, the SR latch 52 outputs "0". Meanwhile, when S (=Voutp)=1 and R (=Voutn)=0, the SR latch 52 outputs "1".

The DC offset voltage of the dynamic latch 51 is caused by a mismatch between the differential pair of the MOS transistors M1 and M2, the MOS transistors M3 and M4, the MOS transistors M5 and M6, the MOS switches M7 and M8, load capacitances CL1 and CL2 of the outputs Voutp and Voutn. As illustrated in FIG. 6, by making the value of load capacitance CVER variable, the DC offset voltage can be adjusted and set to an arbitrary threshold. In the example of FIG. 6, when the load capacitance CVER increases with respect to load capacitance CREF, the threshold becomes large. On the other hand, when the load capacitance CVER decreases with respect to the load capacitance CREF, the threshold becomes small.

Incidentally, the variable threshold comparator 5 need not necessarily be configured as described above. For example, the variable threshold comparator 5 may be configured to compare the output V1 of the first low-pass filter 3 with the threshold VTH at continuous time without synchronizing with the clock, and amplify the output V1 to a logic level.

Figures 8, 9:
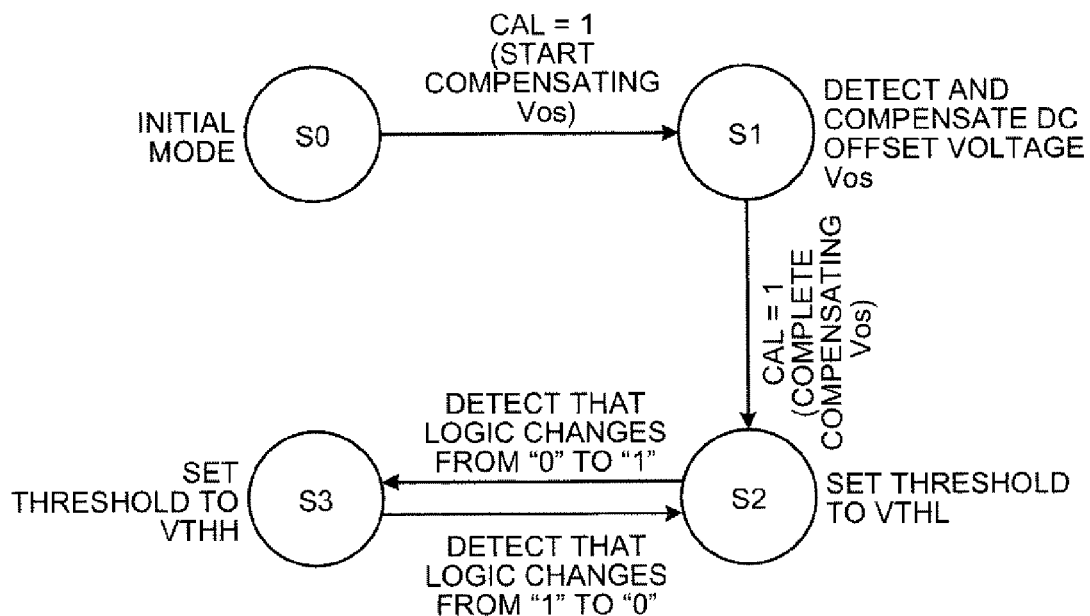
FIG. 8 is a schematic diagram of a truth table of an SR latch in the first embodiment.
FIG. 9 is an exemplary transition diagram for explaining the transition of the operation of a threshold controller in the first embodiment.

The threshold controller 6 searches for and detects the DC offset voltage Vos caused by element dispersions of the variable threshold comparator 5 and compensates it at the time a default value is set. Further, the threshold controller 6 controls the threshold VTH according to the output of the variable threshold comparator 5 during the comparison so that the threshold VTH has a predetermined hysteresis width Vhys. When the threshold controller 6 controls the threshold, the switch 2 is ON to ground the input voltage Vin to the GND. As illustrated in FIG. 9, upon receipt of a correction signal "CAL=1" in initial mode (S0), the threshold controller 6 enters mode (S1) in which the DC offset voltage is initialized. In the mode (S1), the threshold controller 6 starts detecting and compensating the DC offset voltage Vos caused by element dispersions of the variable threshold comparator 5. In the mode (S1), the switch 2 is ON to set the outputs V1 and V2 to the GND potential. The DC offset voltage Vos caused by element dispersions of the variable threshold comparator 5 is normally distributed with a standard deviation determined by the size of the element or the like. Since the outputs V1 and V2 are set to the GND potential, the logic of the output Vo of the variable threshold comparator 5 depends on the DC offset voltage Vos. In modes (S2) and (S3), the threshold controller 6 controls the threshold VTH to a threshold VTHH (a first threshold) or a threshold VTHL (a second threshold) according to the output Vo of the variable threshold comparator 5 so that the threshold VTH has a hysteresis characteristic. Incidentally, the hysteresis width Vhys is expressed as follows:

$$Vhys = VTHH - VTHL$$

Figure 10:
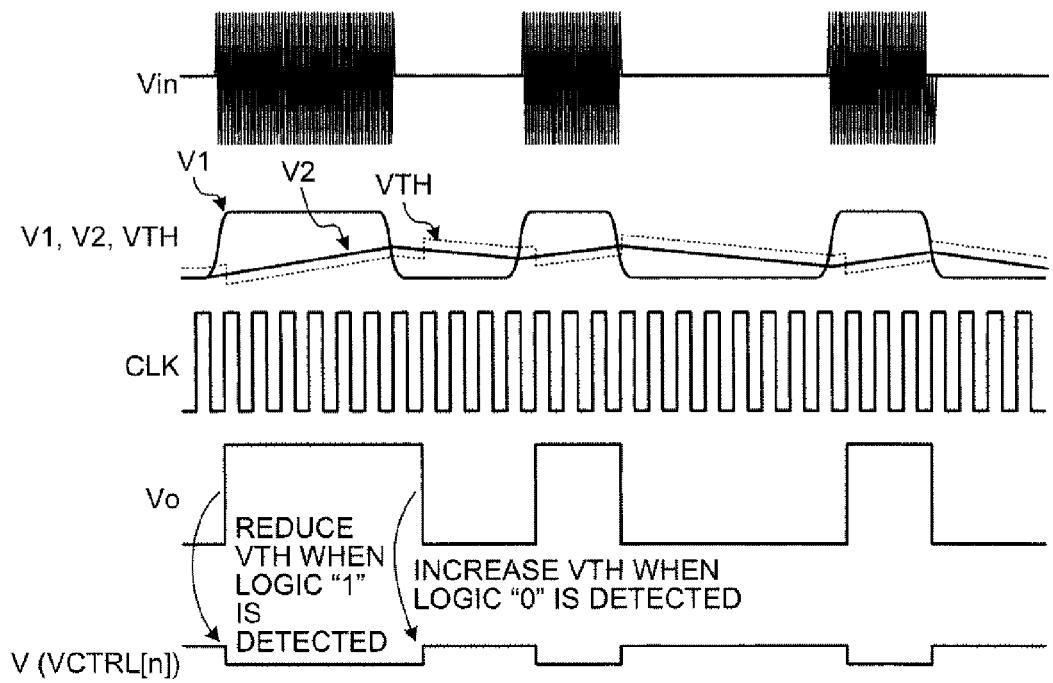
FIG. 10 is an exemplary timing chart of signal waveforms of the ASK demodulator in the first embodiment.

FIG. 10 is a timing chart of signal waveforms of the ASK demodulator 120. As illustrated in FIG. 10, when the ASK signal Vin is input to the rectifier 1, the rectifier 1 rectifies the ASK signal Vin and outputs it to the first low-pass filter 3. The first low-pass filter 3 outputs the signal V1, which corresponds to the envelope curve of the output waveform of the rectifier 1, to the second low-pass filter 4 and the variable threshold comparator 5. The second low-pass filter 4 outputs the integrated signal V2 of the output V1 from the first low-pass filter 3 to the variable threshold comparator 5. The variable threshold comparator 5 adds a predetermined hysteresis width to the output V2 of the second low-pass filter 4 to generate the threshold VTH.

As can be seen from FIG. 10, when detecting logic "1" of the output Vo of the variable threshold comparator 5, the threshold controller 6 causes the output (VCTRL [n]) to fall, and determines that the DC offset voltage Vos is compensated at a voltage V (VCTRL [n]) where the logic of the output Vo changes from 1 to "0". On the other hand, when detecting logic "0" of the output Vo, the threshold controller 6 causes the output (VCTRL [n]) to rise, and determines that the DC offset voltage Vos is compensated at a voltage V (VCTRL [n]) where the logic of the output Vo changes from "0" to "1". The threshold controller 6 need not necessarily detect the DC offset voltage Vos in the manner as described above, but may detect it in any other manner. Upon completion of compensating the DC offset voltage Vos, the threshold controller 6 maintains VCTRL [n], sets the correction signal "CAL=1", and enters the mode (S2).

That is, in the mode (S2) illustrated in FIG. 9, the threshold controller 6 subtracts Vhis/2 from VCTRL [n] set in the mode (S1) where it detects and compensates the DC offset voltage Vos to set the threshold to VTHL. When the logic of the output Vo changes from "0" to "1", the threshold controller 6 enters the mode (S3). In the mode (S3), the threshold controller 6 adds Vhis/2 to VCTRL [n] set in the mode (S1) where it detects and compensates the DC offset voltage Vos to set the threshold to VTHH. When the logic of the output Vo changes from "1" to "0", the threshold controller 6 enters the mode (S2). With this, the threshold controller 6 controls the threshold VTH to have the hysteresis width Vhys (Vhys=VTHH-VTHL).

The threshold VTH is controlled to have the hysteresis width Vhys for the following reasons. Although the threshold controller 6 detects and compensates the DC offset voltage Vos caused by element dispersions of the variable threshold comparator 5 while in the mode (S1), the DC offset voltage Vos drifts due to changes in surrounding conditions such as temperature, power source voltage, and the like. If the DC offset voltage Vos drifts, the hysteresis width Vhys varies. This may result in that a desired noise margin is not ensured. In other words, the temperature and voltage drift amount of the DC offset voltage Vos depend on the level of Vos detected in the mode (S1), and the voltage drift amount is small when Vos is low, while the voltage drift amount is large when Vos is high. Accordingly, when in the mode (S2), the threshold controller 6 sets the hysteresis width Vhys according to the DC offset voltage Vos detected in the mode (S1) to prevent malfunction due to the temperature and voltage drift of Vos.

As described above, according to the first embodiment, the first low-pass filter 3 output a signal corresponding to the envelope curve of an output waveform obtained by rectifying an ASK signal. The second low-pass filter 4 outputs an integrated signal based on the output signal from the first low-pass filter 3. The variable threshold comparator 5 compares the output signal of the first low-pass filter 3 with a threshold obtained by adding a predetermined hysteresis width to the integrated signal output from the second low-pass filter 4. According to the comparison result, the variable threshold comparator 5 determines the output logic. At this point, the threshold controller 6 sets a predetermined hysteresis width based on a DC offset voltage caused by element dispersions of the variable threshold comparator 5, thereby controlling the threshold. With this, it is possible to compensate the variation of the hysteresis width that accompanies the drift of the DC offset voltage due to changes in surrounding conditions such as temperature, power source voltage, and the like. Thus, it is possible to implement a stable ASK demodulator with high reception sensitivity, a communication module, a communication device, and an ASK demodulation method.

Figure 11:
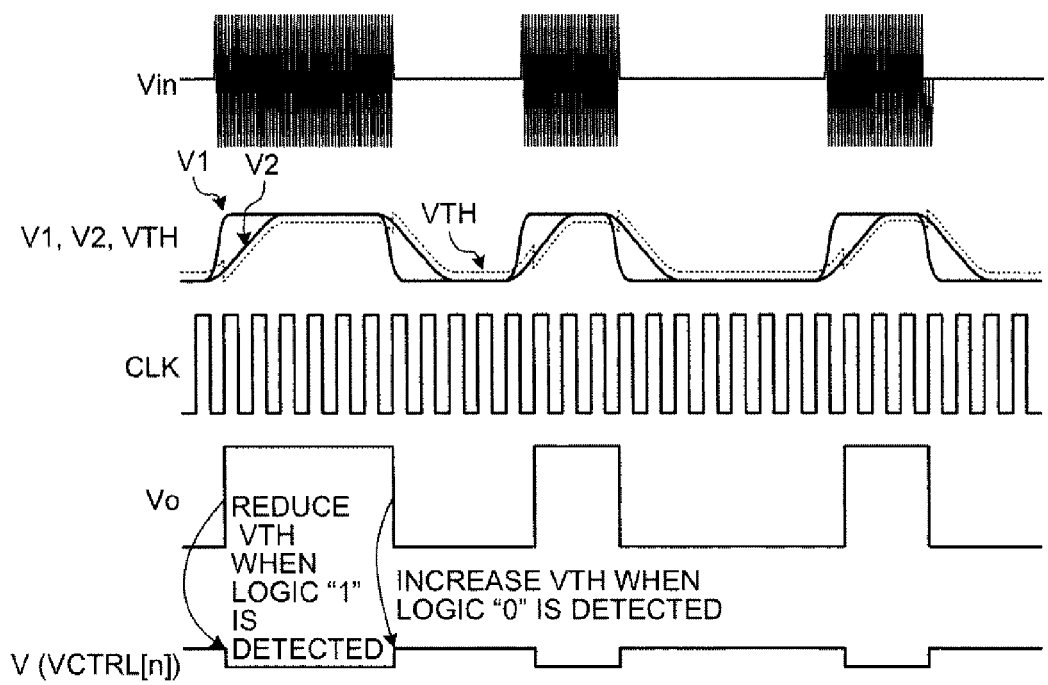
FIG. 11 is another exemplary timing chart of signal waveforms of the ASK demodulator in the first embodiment.

Incidentally, since the second low-pass fitter 4 of the ASK demodulator 120 of the first embodiment outputs the integrated signal V2 based on the output signal V1 from the first low-pass filter 3, the integrated signal V2 varies depending on the rate of the logic "0" or "1" of the ASK signal. Therefore, if the ASK signal is weak and the rate of the logic "0" or "1" is biased, the ASK signal may not be stably demodulated. To avoid such a situation, the time constant of the second low-pass filter 4 may be adjusted such that its delay is larger than the clock period and also the time constant is within the range where it can track the data rate of the input Vin. FIG. 11 illustrates the signal waveform of the ASK demodulator 120 in this case. As illustrates in FIG. 11, when the time constant of the second low-pass filter 4 is adjusted such that its delay is larger than the clock period and also the time constant is within the range where it can track the data rate of the input Vin, the integrated signal V2 does not depend on the rate of the logic "0" or "1" of the ASK signal. Accordingly, the integrated signal V2 corresponds to the output signal V1 from the first low-pass filter 3 when the logic of the output signal V1 changes. Thus, even if the ASK signal is weak and the rate of the logic "0" or "1" is biased, the ASK signal can be stably demodulated with high reception sensitivity.

In the following, a second embodiment of the invention will be described with reference to FIGS. 12 and 13. Constituent elements corresponding to those of the first embodiment are designated by the same reference numerals, and their description will not be repeated.

In the first embodiment, the variable threshold comparator 5 of the ASK demodulator 120 corrects the DC offset voltage Vos caused by element dispersions of the variable threshold comparator 5 by adjusting the load capacitance CVER of the dynamic latch 51. With this, because it is easy to set the threshold VTH to a small value of, for example, about 2 mV, the reception sensitivity can be increased. However, if the hysteresis width Vhys is set to a small value, malfunction is likely to occur due to noise. Therefore, according to the second embodiment, to improve the noise resistance when the hysteresis width Vhys is set to a small value, a noise remover 310 is added to the output Vo side of the variable threshold comparator 5. Further, the output Vout of the noise remover 310 is connected to the threshold controller 6.

Figure 12:
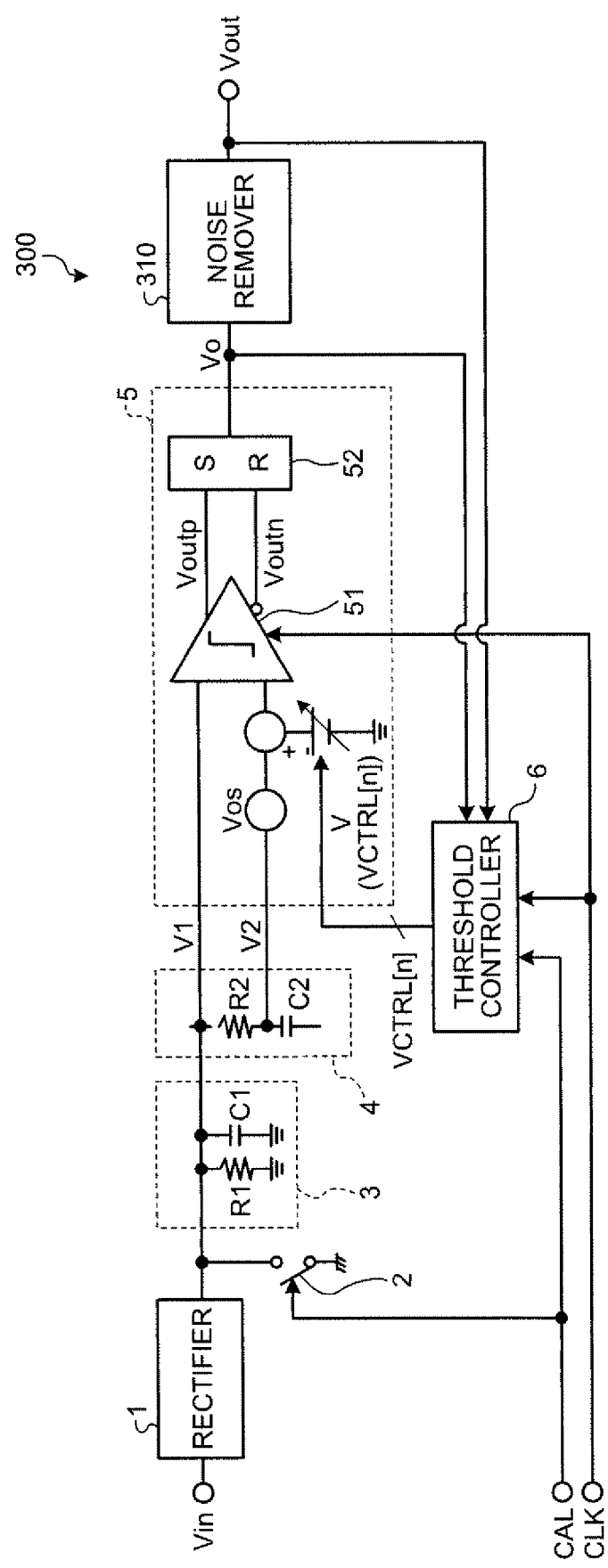
FIG. 12 is an exemplary circuit diagram of an ASK demodulator according to a second embodiment of the invention.
Figure 13:
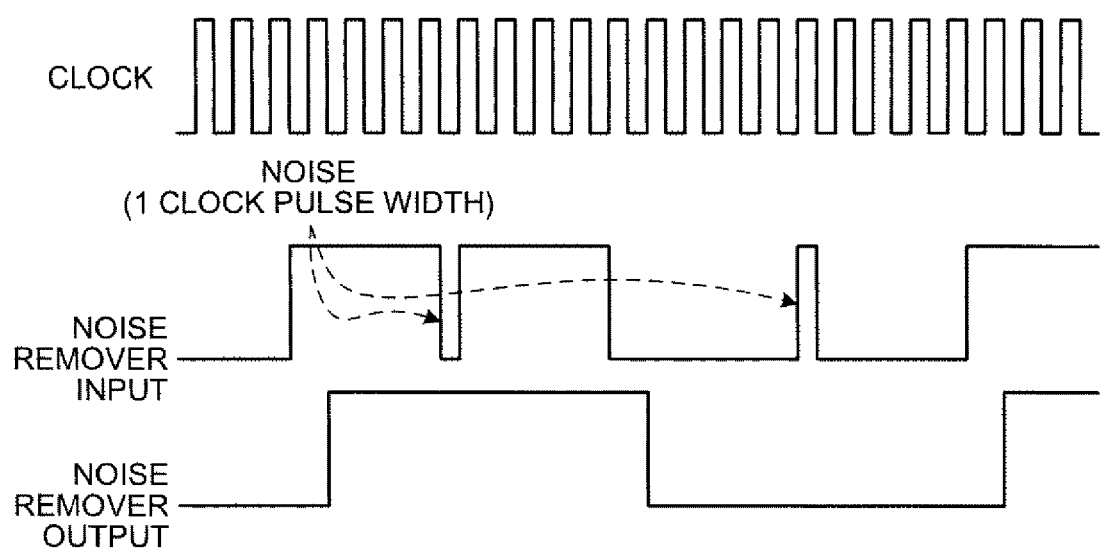
FIG. 13 is an exemplary timing chart of the operation of a noise remover in the second embodiment.

FIG. 12 is a circuit diagram of an ASK demodulator 300 according to the second embodiment. As illustrated in FIG. 12, the ASK demodulator 300 further comprises the noise remover 310 on the output Vo side of the variable threshold comparator 5. Further, the output Vout of the noise remover 310 is connected to the threshold controller 6.

The noise remover 310 determines reception state as logic "0" reception state when logic "0" continues for N samples and determines it as logic "1" reception state when logic "1" continues for N samples. Accordingly, the noise remover 310 determines that a signal with a pulse width of (N−1) samples or less is noise, and thereby removes the signal (noise). In other words, the noise remover 310 does not allow the noise to be sent to the latter stage. FIG. 13 illustrates this operation of the noise remover 310 (N=2).

In addition, as illustrated in FIG. 12, while in the modes (S2) and (S3), the threshold controller 6 controls the threshold VTH to the threshold VTHH or the threshold VTHL according to the output Vout of the noise remover 310, instead of the output Vo of the variable threshold comparator 5, so that the threshold VTH has a hysteresis characteristic.

As described above, according to the second embodiment, since malfunction is likely to occur due to noise if the hysteresis width is set to a small value to increase the reception sensitivity, the noise remover 310 is added to the latter stage of the threshold controller 6. With this, the noise removal effect can be improved. Thus, it is possible to implement a stable ASK demodulator with high reception sensitivity.

Incidentally, since the second low-pass filter 4 of the ASK demodulator 300 of the second embodiment outputs the integrated signal V2 based on the output signal V1 from the first low-pass filter 3, the integrated signal V2 varies depending on the rate of the logic "0" or "1" of the ASK signal. Therefore, if the ASK signal is weak and the rate of the logic "0" or "1" is biased, the ASK signal may not be stably demodulated. To avoid such a situation, the time constant of the second low-pass filter 4 may be adjusted such that its delay is larger than the value of the clock period×N and also the time constant is within the range where it can track the data rate of the input Vin. In this case also, as illustrated in FIG. 11, the integrated signal V2 does not depend on the rate of the logic "0" or "1" of the ASK signal. Accordingly, the integrated signal V2 corresponds to the output signal V1 from the first low-pass filter 3 when the logic of the output signal V1 changes. Thus, even if the ASK signal is weak and the rate of the logic "0" or "1" is biased, the ASK signal can be stably demodulated with high reception sensitivity.

Moreover, N can be set to a larger value by increasing the rate of the oversampling clock. With this, the noise removal effect can be further improved.

In the first and second embodiments described above, although a communication device provided with the ASK demodulator is described as an RFID tag, this is by way of example and not by way of limitation. The communication device provided with the ASK demodulator may be, for example, a device that receives a control signal from a remote controller.

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An amplitude shift keying (ASK) demodulator comprising:
    a rectifier configured to rectify an ASK signal;
    a first low-pass filter configured to output a signal corresponding to an envelope curve output from the rectifier;
    a second low-pass filter configured to output an integrated signal of the signal output from the first low-pass filter;
    a comparator configured to detect an output logic in accordance with comparison between the signal output from the first low-pass filter and a threshold obtained by adding a predetermined hysteresis width to the integrated signal output from the second low-pass filter; and
    a threshold controller configured to control the threshold by setting the predetermined hysteresis width based on a direct current offset voltage caused by element dispersions of the comparator.

2. The ASK demodulator of claim 1, wherein the threshold controller is configured to detect and compensate the direct current offset voltage to obtain a reference voltage,
    the threshold controller sets a first threshold as the threshold when the output logic from the comparator changes from 0 to 1, the first threshold being obtained by adding half of the predetermined hysteresis width to the reference voltage, and
    the threshold controller sets a second threshold as the threshold when the output logic from the comparator changes from 1 to 0, the second threshold being obtained by subtracting half of the predetermined hysteresis width from the reference voltage.

3. The ASK demodulator of claim 1, further comprising a noise remover configured to be connected to output of the comparator and input of the threshold controller, and determine that a signal with a predetermined pulse width or less is noise to remove the noise, wherein
    the threshold controller is configured to set the predetermined hysteresis width based on output from the noise remover to control the threshold.

4. The ASK demodulator of claim 1, wherein a time constant of the second low-pass filter is adjusted such that a delay of the time constant is larger than a clock period and the time constant is within a range where the time constant can track a data rate of the ASK signal.

5. The ASK demodulator of claim 2, wherein a time constant of the second low-pass filter is adjusted such that a delay of the time constant is larger than N times of a clock period and the time constant is within a range where the time constant can track a data rate of the ASK signal.

6. The ASK demodulator of claim 1 further comprising an antenna configured to receive the ASK signal to be demodulated.

7. A communication device comprising:
    a loop antenna configured to receive an amplitude shift keying (ASK) signal; and
    an ASK demodulator configured to demodulate the ASK signal received by the loop antenna, the ASK demodulator comprising
        a rectifier configured to rectify an ASK signal;
        a first low-pass filter configured to output a signal corresponding to an envelope curve output from the rectifier;
        a second low-pass filter configured to output an integrated signal of the signal output from the first low-pass filter;
        a comparator configured to detect an output logic in accordance with comparison between the signal output from the first low-pass filter and a threshold obtained by adding a predetermined hysteresis width to the integrated signal output from the second low-pass filter; and
        a threshold controller configured to control the threshold by setting the predetermined hysteresis width based on a direct current offset voltage caused by element dispersions of the comparator,
    a memory configured to store at least tag identification information; and
    a signal processor configured to write data to and read data from the memory based on a data signal received from the ASK demodulator.

8. An amplitude shift keying (ASK) modulation method comprising:
    rectifying an ASK signal;
    first outputting a signal corresponding to an envelope curve output at the rectifying;
    second outputting an integrated signal of the signal output at the first outputting;
    a comparator detecting an output logic in accordance with comparison between the signal output at the first outputting and a threshold obtained by adding a predetermined hysteresis width to the integrated signal output at the second outputting; and
    controlling the threshold by setting the predetermined hysteresis width based on a direct current offset voltage.

* * * * *